United States Patent [19]

Codrino

[11] 4,287,397
[45] Sep. 1, 1981

[54] DIRECTIONAL SIGNALING MECHANISM FOR AUTOMOTIVE VEHICLES

[76] Inventor: Giuseppe Codrino, Via Stazione, 2, 15028 Quattordio (Alessandria), Italy

[21] Appl. No.: 34,478

[22] Filed: Apr. 30, 1979

[30] Foreign Application Priority Data

May 3, 1978 [IT] Italy .............................. 22970 A/78

[51] Int. Cl.³ ............................................ H01H 3/16
[52] U.S. Cl. ............................. 200/61.27; 200/61.54
[58] Field of Search .................... 200/61.27–61.38, 200/61.54; 340/81 R, 81 F

[56] References Cited

U.S. PATENT DOCUMENTS

| 3,699,286 | 10/1972 | Suzuki et al. | 200/61.34 |
| 3,710,049 | 1/1973 | Burgess et al. | 200/61.27 |
| 4,123,632 | 10/1978 | Muto | 200/61.27 |

Primary Examiner—J. V. Truhe
Assistant Examiner—Morris Ginsburg
Attorney, Agent, or Firm—Bucknam and Archer

[57] ABSTRACT

A switching device, capable of being applied to the steering column of an autovehicle is described. The device comprises a sleeve which is provided with a front seat for housing one of the releasing pawls. The releasing pawl is capable of engaging with a shaped sector formed in an annular body operable by means of a radial lever connected to the steering wheel. The shaped sector presents a substantially concave central portion delimitated by two tooth raised portions and two nearly flat side portions. The annular body supports a resiliently biased contact plate and is provided with a cylindrical seat in which is housed a resilient pin. Near the annular body is located a disc structure on which are arranged three fixed contacts having suitably sized contacting surfaces. The fixed contacts are connected to the contact plate by slightly rotating the annular body. The device permits to avoid a double operation for each signalling maneuver.

5 Claims, 5 Drawing Figures

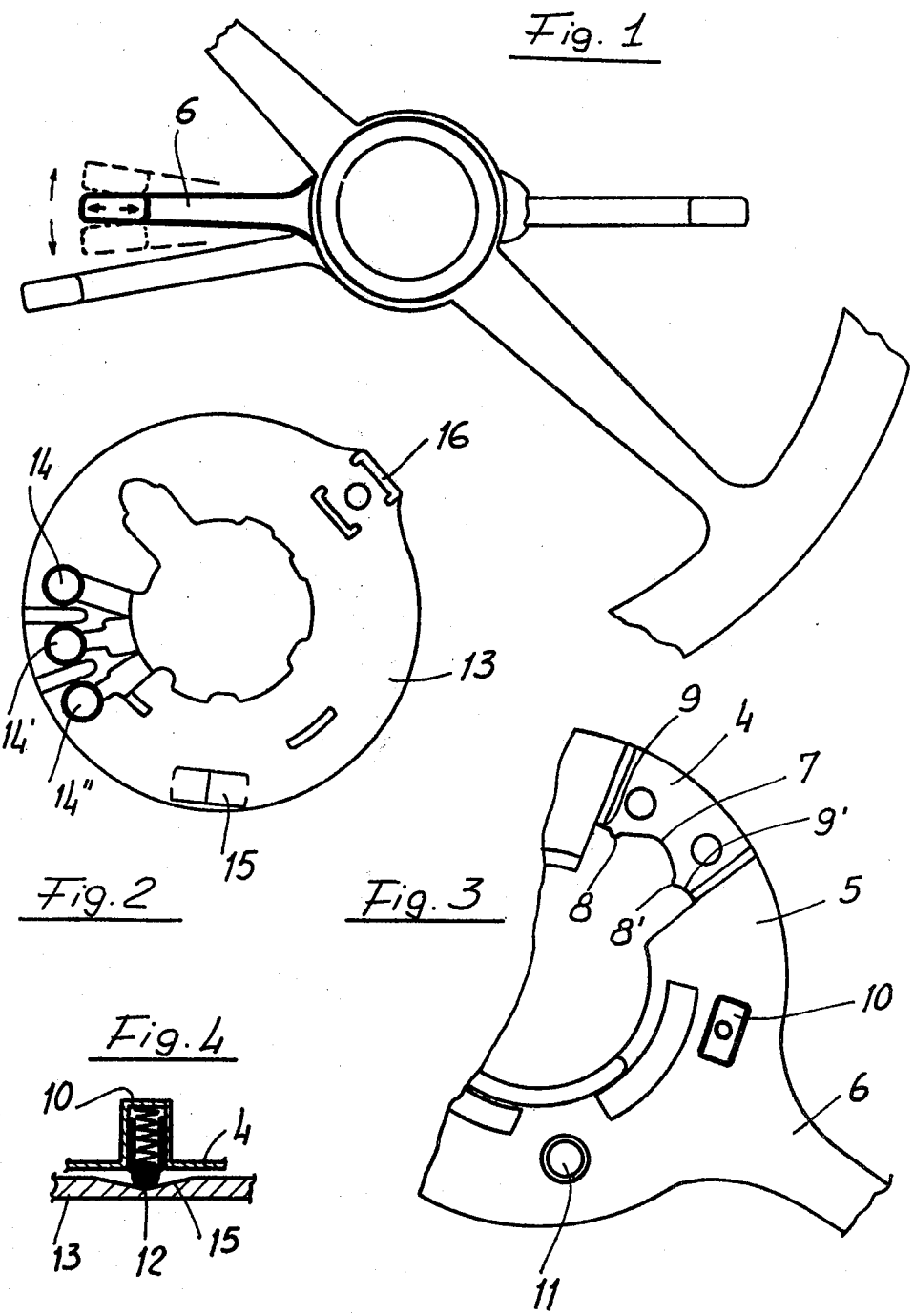

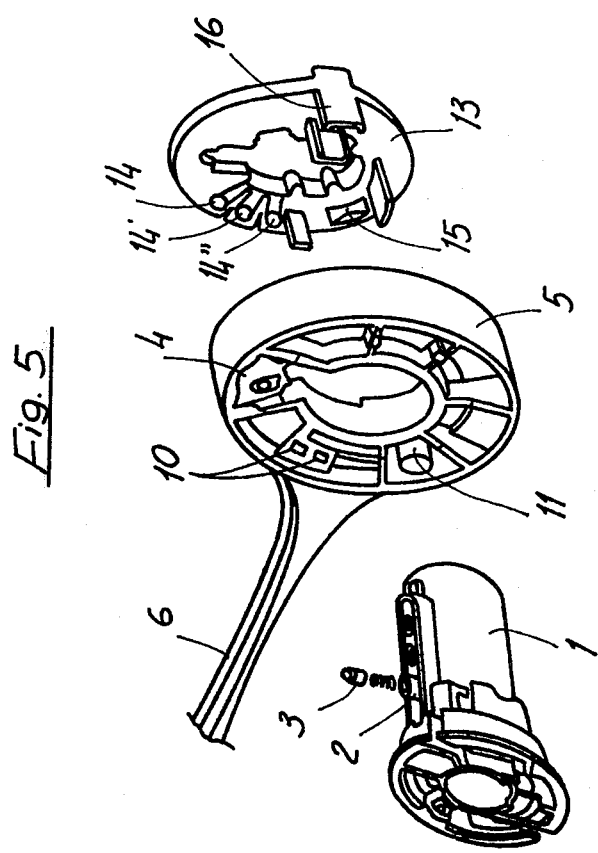

DIRECTIONAL SIGNALING MECHANISM FOR AUTOMOTIVE VEHICLES

As it is known there are commercially available switching assemblies or devices, for driving or controlling light and acoustical signaling elements equipping any autovehicle in general.

These switching devices permit, with respect to the driving of the direction signaling elements, to carry out a counter-manoeuvre, within a rather broad range, on the steering wheel, upon signaling the direction change, without interrupting the driving circuit of the signaling elements.

As it is known, all the autovehicles are provided, at suitable positions, with intermittently light elements, effective to signal the changes to the traveling direction.

These direction signaling elements are driven by a switching device, as inserted in a box-like body, having an approximately cylindrical shape, jointly to other switch elements, related to the outside light circuits of the autovehicle, to the windscreen wiper and, possibly, to the window washing device and the operation of the acoustical warning or signaling elements.

In the aforesaid commercially available driving devices, the signaling of a change in the traveling direction of the autovehicle is obtained by upwardly or downwardly shifting a lever.

Furthermore, upon carrying out the aforesaid operation, as the steering wheel returns to the normal rectilinear driving direction, a suitable device automatically causes the lever to return to the rest position thereby interrupting the circuits supplying the several light elements.

However this device does not inherently permit, upon signaling a direction change, to carry out a counter-manoeuvre on the steering wheel without the return of the device to its neutral position.

In fact this operation would automatically operate the aforesaid device, thereby opening the circuits of the direction signaling elements.

This practical drawback is, on the contrary, eliminated by the switching device or assembly described in U.S. Pat. No. 3,784,770.

In fact this switching device permits the steering wheel to be counter-manoeuvred, without causing an opening of the related circuit for signalling the direction change.

It should however be pointed out that, during the driving, the driver is frequently compelled to use the direction signaling devices to simply signal the overtaking manoeuvres and the subsequent re-entries in the proper travel path.

However, due to the little deviation from the trajectory, as requested by the aforesaid manoeuvre, the steering wheel is not rotated to a sufficient degree to engage the return device for the lever driving the signaling elements.

Sometimes this fact has the result that, due to oversights, the driver continues its travel with the direction signaling elements in operation.

Accordingly the driver is compelled to carry out a double operation, for each signaling manoeuvre, since, in order to close the related circuit, he has necessarily to trigger the automatic return device, by a full rotation of the driving lever in the corresponding direction.

This drawback is, on the contrary, eliminated by the improved switching device according to the present invention.

In fact, this switching device comprises fixed contacts, located at close positions, effective to be electrically connected, in pairs, by means of a wiping contact, located on the annular body rigid with the lever for driving the circuits supplying the directon signaling elements.

Accordingly, due to the mutual arrangement of the aforesaid contacts, in order to briefly signal the start of an overtake manoeuvre, it is sufficient to maintain fixed the driving lever, by means of a small preliminary rotation of the annular body in the desired direction, until the completion of the path or track change. In this manner, the driver maintains the actuating member fixed in the desired position during the change of lanes.

By releasing said lever, this latter resiliently returns to the rest position thereof, in such a way that the wiping contact rests solely on the fixed intermediate contact, that is leaving in the opening condition both the circuits supplying the direction signaling elements.

Obviously, by fully rotating the driving lever of said direction signaling elements, the conventional mechanisms for holding and automatically returning said lever is engaged.

These and other characteristics, of functional and constructional nature, of the improved switching device according to the present invention, will become more apparent from the several figures of the accompanying drawings, where:

FIG. 1 is a schematic view illustrating the location of the switching device on the steering column;

FIG. 2 illustrates the annular body supporting the three fixed end contacts;

FIG. 3 is a partial view illustrating the movable sector bearing the wiping or sliding contact;

FIG. 4 is a cross-section of the the disc structure as taken at the resilient return member;

FIG. 5 is an exploded perspective view illustrating the disc structure and the sleeve on which it is are engaged, jointly to the other fixed and movable parts of the device or assembly.

Referring particularly to the numerical symbols of the several figures of the accompanying drawings, the sleeve (1) on which are engaged or inserted the fixed and movable annular structures forming the assembly or device, is provided with a front seat (2) for housing the pawl (3).

The pawl is effective to engage with the shaped sector (4) of the annular body (5) operable by means of the radial lever (6).

In particular, the shaped sector 4, is provided with a substantially concave central portion (7) delimited by two tooth raised portions (8) and (8') and, furthermore, with two side portions (9) and (9') having a nearly flat configuration.

That same angular body (5) engaged on the sleeve carries a resiliently biased contact plate (10) and is provided with a cylindrical seat (11) in which is housed a resilient pin (12).

Near the annular body is located the disc structure (13) on which are located three fixed contacts (14), (14') and (14") having suitably sized contacting surfaces.

Practically, these contacts are located in such a way that they may be connected, in pairs, to the contact plate 10, by slightly rotating said annular body (5), which plate is located in the concave portion (7) of the shaped section (4).

Furthermore, in the aforesaid disc structure (13) is formed a dihedral recess (15) effective to house the resilient pin (12) acting to restore the annular body (5) as this latter is released to the rest position.

Obviously, if necessary, this annular body may be fully rotated, by exceeding the counter biassing between the releasing pawl 3 and the teeth (8) and (8') in such a way as to locate the pawl on the flat portions (9) and (9').

In this case also the device for automatically returning the annular body (5), becomes engaged as applied on the U-shaped element (16).

Accordingly, due to the particular size of the fixed and wiping contacts and the shape of the position marking sector (4) it is possible to manoeuvre the lever (6) according to two ways, depending on the driving needs.

From the above description and the observation of the several figures of the accompanying drawings, the greater functionality and facility of use characterizing the improved switching device according to the invention are self-evident.

I claim:

1. A switching system for the steering wheel of a motor vehicle, which comprises a radial lever (6), a return device for the radial lever, said lever being connected with the steering wheel, said radial lever being capable of actuating the return device (16), an annular body (5) actuatable by said radial lever, said annular body being provided with a sleeve (1) and a disc member (13), located in confronting relationship with said annular body, a resiliently biased contact plate (10) supported by said annular body (5), three fixed contacts (14, 14', 14") located in said disc member (13) in proximity one to the other and essentially diametrically opposite to said return device, means for establishing contact between said contact plate (10) and said fixed contacts, means whereby said annular body is capable of both a slight rotation and a full rotation, the position and the size of said fixed contacts and said contact plate being predetermined as to establish contact thereof in pairs with said contact plate upon said slight rotation of the annular body, said return device being actuated upon full rotation of said annular body.

2. The system according to claim 1 wherein said annular body has a shaped sector provided with a cavity and said contact plate (10) is carried by said annular body and is located in said cavity.

3. The system according to claim 2 wherein said cavity has two tooth-shaped portions and two side portions, and said sleeve has a front seat, and the means for establishing contact between said fixed contacts and said contact plate comprises a pawl located in said front seat, said pawl engaging said tooth-shaped portions upon a slight rotation of the annular body.

4. The system according to claim 1 wherein said return device comprises a resilient pin (12) housed in a cylindrical seat on said annular body and upon full rotation of the annular body, said resilient pin engaging said return device.

5. In a direction signaling apparatus for a vehicle and having a set of fixed switching contacts disposed for electrically connective cooperation with a set of movable switching contacts carried on a supporting body rotatably movable by a lever, said body being movable in one direction from a neutral position, corresponding to vehicle travel in a straight-ahead direction, to a first limit position, corresponding to vehicle travel in a full right turn direction, and said body being movable in the opposite direction from said neutral position to a second limit position, corresponding to vehicle travel in a full left turn direction, said set of fixed switching contacts and said set of movable switching contacts establishing a right turn indication circuit condition when said body is in said first limit position and establishing a left turn indication circuit condition when said body is in said second limit position, and establishing a non-turn indication circuit condition when said body is in said neutral position; signal cancelation means responsive to the movement of a steering member of the vehicle to return said body to its neutral position when said body is in one of said first and second limit positions and the steering member executes a rotary movement in a direction corresponding to a vehicle turn opposite to the turn indication associated with such limit position, and such rotary movement executed is greater than a predetermined response threshold amplitude, the improvement which comprises in combination: said set of fixed switching contacts and said set of movable switching contacts being of angular extension and positioned in relation to one another such that a respective right turn, left turn indication circuit condition can be established by a corresponding limited rotation of said body by an amount less than the rotation required to move the body from its neutral position to one of said first and second limit positions, and said signal cancelation means has a response threshold greater than the magnitude of such limited rotation whereby said body can be given such limited rotation in a selected direction to establish a corresponding turn indication circuit condition and the body will not be returned to its neutral position to cancel such circuit condition.

* * * * *